United States Patent
Kallweit et al.

(10) Patent No.: US 11,867,551 B2
(45) Date of Patent: Jan. 9, 2024

(54) SIGNAL TRANSMITTER FOR A FILL LEVEL SENSOR OF A CONTAINER OF A MOTOR VEHICLE, AND METHOD FOR PRODUCING A SIGNAL TRANSMITTER FOR A FILL LEVEL SENSOR OF A CONTAINER OF A MOTOR VEHICLE

(71) Applicant: Vitesco Technologies GmbH, Hannover (DE)

(72) Inventors: Gerhard Kallweit, Schwalbach a. Ts. (DE); Claus Eichelmann, Schwalbach a. Ts. (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 455 days.

(21) Appl. No.: 17/258,835

(22) PCT Filed: Jul. 10, 2019

(86) PCT No.: PCT/EP2019/068575
§ 371 (c)(1),
(2) Date: Jan. 8, 2021

(87) PCT Pub. No.: WO2020/011871
PCT Pub. Date: Jan. 16, 2020

(65) Prior Publication Data
US 2021/0302218 A1 Sep. 30, 2021

(30) Foreign Application Priority Data
Jul. 10, 2018 (DE) .................. 10 2018 211 399.8

(51) Int. Cl.
*G01F 23/36* (2006.01)
*B60K 15/07* (2006.01)
(Continued)

(52) U.S. Cl.
CPC ............ *G01F 23/363* (2013.01); *B60K 15/07* (2013.01); *H01C 10/30* (2013.01); *H01C 10/345* (2013.01);
(Continued)

(58) Field of Classification Search
None
See application file for complete search history.

(56) References Cited

U.S. PATENT DOCUMENTS 5,743,136 A * 4/1998 Gaston ................. H01C 10/305
73/313
6,369,690 B1 4/2002 Chen
(Continued)

FOREIGN PATENT DOCUMENTS

| CN | 105637330 | 6/2016 |
| CN | 206440349 U | 8/2017 |

(Continued)

OTHER PUBLICATIONS

Office Action dated Feb. 22, 2022 issued in European Patent Application No. 19 739 269.9.
(Continued)

*Primary Examiner* — K. Wong
(74) *Attorney, Agent, or Firm* — Cozen O'Connor (57) ABSTRACT

A signal transmitter for a fill level sensor, a conductor path arrangement is printed on a resistor arrangement. The resistor arrangement is located below a slideway and is accessible between conductor path sections for trimming of the resistor. The signal transmitter is of particularly compact configuration and can be produced at low cost.

12 Claims, 5 Drawing Sheets

(51) Int. Cl.
*H01C 10/30* (2006.01)
*H01C 10/34* (2006.01)
*H01C 17/075* (2006.01)
*B60K 15/03* (2006.01)

(52) U.S. Cl.
CPC .. *H01C 17/075* (2013.01); *B60K 2015/03217* (2013.01)

(56) References Cited

U.S. PATENT DOCUMENTS

| | | | | |
|---|---|---|---|---|
| 6,564,631 | B1* | 5/2003 | Lake | G01F 23/363 340/456 |
| 6,588,288 | B1* | 7/2003 | Swindler | H01C 10/48 338/126 |
| 6,634,229 | B1* | 10/2003 | Kazkaz | G01F 23/243 73/304 R |
| 6,862,919 | B2* | 3/2005 | Lin | G01N 27/226 73/304 C |
| 6,886,403 | B2* | 5/2005 | LaBarge | G01F 23/363 73/317 |
| 7,091,819 | B1* | 8/2006 | Forgue | H01C 10/32 338/33 |
| 9,513,155 | B2* | 12/2016 | Harper | G01F 23/26 |
| 11,674,840 | B2* | 6/2023 | Mondragón | G01F 23/363 73/114.54 |
| 2004/0255669 | A1 | 12/2004 | LaBarge et al. | |

FOREIGN PATENT DOCUMENTS

| | | |
|---|---|---|
| DE | 102011081631 | 2/2013 |
| EP | 0023949 | 2/1981 |
| EP | 0766074 A2 | 4/1997 |
| FR | 2455346 | 11/1980 |
| WO | WO 03/003384 A2 | 1/2003 |
| WO | WO 03003384 | 1/2003 |

OTHER PUBLICATIONS

Office Action of the corresponding German Patent Application No. 10 2018 211 399.8.

Office Action dated Aug. 20, 2023 issued in Chinese Patent Application No. 201980035033.0.

* cited by examiner

SIGNAL TRANSMITTER FOR A FILL LEVEL SENSOR OF A CONTAINER OF A MOTOR VEHICLE, AND METHOD FOR PRODUCING A SIGNAL TRANSMITTER FOR A FILL LEVEL SENSOR OF A CONTAINER OF A MOTOR VEHICLE

CROSS REFERENCE TO RELATED APPLICATIONS

This is a U.S. national stage of Application No. PCT/EP2019/068575 filed Jul. 10, 2019. Priority is claimed on German Application No. DE 10 2018 211 399.8 filed Jul. 10, 2018 the content of which is incorporated herein by reference.

BACKGROUND OF THE INVENTION

1. Field of the Invention

The invention relates to a signal transmitter for a fill level sensor of a container of a motor vehicle for producing electric signals as a function of a fill level, having a resistor arrangement, a conductor path arrangement connected to the resistor arrangement, and a sliding contact that can be moved in accordance with the fill level and slides across a slideway of the conductor path arrangement, wherein the resistor arrangement and the conductor path arrangement at least partially overlap. The invention furthermore relates to a method for producing a signal transmitter for a fill level sensor of a container of a motor vehicle, in which a conductor path arrangement is connected to a resistor arrangement, wherein the resistor arrangement and the conductor path arrangement at least partially overlap.

2. Description of Related Art

Fill level sensors of the type stated at the outset are designed as potentiometers and are used, for example, in fuel containers to detect a float. The float follows the fill level in the container and, in such fill level sensors, is connected to the sliding contact by a levertype transmitter. Thus, the sliding contact slides across the slideway of the conductor path arrangement as the container is filled or emptied. The signal transmitter has a variable resistance, depending on the position of the sliding contact on the conductor path arrangement.

In the case of a signal transmitter known in practice, the resistor arrangement is arranged radially outside the conductor path arrangement and is connected to the slideway via individual conductor paths. For production, the conductor path arrangement is produced first, and the resistor arrangement is then applied as a layer to the conductor path arrangement.

The disadvantage with the known signal transmitter is that the thickness of the resistor arrangement varies since the conductor paths of the conductor path arrangement are raised. Furthermore, the signal transmitter has very large dimensions owing to the arrangement of the resistor arrangement radially outside the conductor path arrangement.

SUMMARY OF THE INVENTION

One aspect of the invention is based on further developing a signal transmitter of the type mentioned in the introduction in such a way that it is particularly compact and can be produced at particularly low cost. One aspect of the invention further relates to a method for producing a signal transmitter that is particularly inexpensive to use.

According to one aspect of the invention, the first-mentioned problem is solved by virtue of the fact that the conductor path arrangement is arranged on the resistor arrangement.

By virtue of this configuration, the resistor arrangement can be produced without being affected by the conductor path arrangement. It is therefore a particularly simple matter to produce the resistor arrangement with a constant layer thickness and constant resistance values. Moreover, the resistor arrangement is protected by the conductor path arrangement from contact with the sliding contact. As a result, the resistor arrangement can be arranged particularly close or, in the most favorable case, below the slideway. As a result, the signal transmitter is of particularly compact configuration.

As an alternative or in addition, it is also possible for the resistor arrangement to be arranged below the slideway. In other words, the resistor arrangement can be arranged between the slideway and the carrier board.

Arrangement of the resistor arrangement below the slideway is understood to mean that the plane of the resistor arrangement is below the plane of the slideway. In this context, embodiments are included in which the resistor arrangement and the slideway overlap or do not overlap in a view perpendicular to the plane of extent of the slideway and/or of the resistor arrangement. In other words, embodiments are included which have an overlap or no overlap between the slideway and the resistor arrangement in a two-dimensional projection orthogonal to at least one of the two planes.

An arrangement of the resistor arrangement below the slideway is understood to mean that only embodiments in which the resistor arrangement and the slideway overlap in a view perpendicular to the plane of extent of the slideway and/or of the resistor arrangement are included. Consequently, embodiments without such an overlap are not included in this context. In other words, only embodiments are included which have an overlap between the slideway and the resistor arrangement in a two-dimensional projection orthogonal to at least one of the two planes.

In another advantageous refinement of the invention, the manufacture of the sensor is made particularly simple if the resistor arrangement is a layer arranged on a carrier board. By virtue of this configuration, the carrier board with the conductor path arrangement and the resistor arrangement are arranged sandwich-fashion one above the other. As a result, the sensor is furthermore of particularly compact configuration.

According to another advantageous development of the invention, trimming the resistor of the resistor arrangement is particularly simple if the conductor path arrangement has individual conductor path sections arranged on the resistor arrangement and connected electrically thereto. By virtue of this configuration, the resistor arrangement is easily accessible between the conductor path sections and can be modified easily by removal of material.

According to another advantageous development of the invention, the signal transmitter is particularly compact if the resistor arrangement is arranged below the slideway.

According to an advantageous development or alternative, the signal transmitter has conductor path sections which extend transversely to the direction of extent of the slideway or of the conductor path arrangement. In this case, it is also possible for the direction of extent of the conductor path sections to have just one direction component transverse to the direction of extent of the slideway or conductor path arrangement. In this case, the conductor path sections can be arranged spaced apart from one another. It is particularly advantageous if they are arranged spaced apart from one another transversely to the direction of extent thereof. The accessibility of the resistor arrangement can thereby be improved in order to provide a material recess on the resistor arrangement with the aid of removal of material in order to adapt the resistance of the resistor arrangement.

It is particularly advantageous if the conductor path sections of the signal transmitter are spaced apart from one another in such a way that removal of material is possible in at least one region of the resistor arrangement not covered by the conductor path sections owing to the spacing of the conductor path sections.

In another or more advanced embodiment, the resistor arrangement of the signal transmitter has at least one material recess, which is arranged between two sections of the resistor arrangement, wherein these two sections of the resistor arrangement are covered by two mutually adjacent and spaced conductor path sections.

By such material recesses, the electric resistance value of the resistor arrangement can be adapted. The removal of material is advantageously carried out with the aid of a laser since it does not damage the conductor path arrangement and allows precise material recesses.

In another or more advanced embodiment, the material recess in the resistor arrangement extends from a side of the resistor arrangement that faces away from the carrier board to a side of the resistor arrangement that faces the carrier board.

In a more advanced or alternative embodiment, the at least one material recess in the resistor arrangement is not arranged directly below the slideway. In other words, there is no material recess, arranged between the slideway and the carrier board, in the resistor arrangement that is provided to create a certain electric resistance value of the resistor arrangement. Arranging material recesses in this region could have the effect that abraded particles that are formed because of the sliding contact with the slideway become stuck in material recesses in the resistor arrangement and thus modify and distort the resistance value.

In a more advanced or alternative embodiment, the conductor path sections of the signal transmitter have a material thickness, measured in the plane of extent thereof and transversely to the direction of extent thereof, which decreases in the direction of extent of the conductor path sections. This material thickness preferably decreases with an increasing distance between the conductor path sections and the slideway. As a result, access to the resistor arrangement is simplified, and the at least one material recess in the resistor arrangement can be given larger dimensions.

In a more advanced embodiment, at least one of the conductor path sections has two subsections which have different material thicknesses from one another. It is also possible for a plurality of such conductor path sections to be provided. In this case, the at least one material recess in the resistor arrangement is located exclusively between two sections of the resistor arrangement which are covered by two subsections of two adjacent conductor path sections. These two subsections are preferably in each case the subsection with the lower material thickness.

Signal transmitters of the type in question are often used together with a pivoted lever, at the end of which a float is arranged, in order to measure the fill level of a fuel container. In this case, the signal transmitter is often arranged at a distance from the bearing location of said pivoted lever, and therefore a curved movement of the sliding transmitter may be obtained. As a result, the slideway and/or the conductor path arrangement extend/s in a curved shape. In this case, the conductor path sections preferably extend toward the outside of the curve. The distance between the adjacent conductor path sections is thereby increased with increasing distance from the slideway or conductor path arrangement, facilitating access to the resistor arrangement. The slideway or the conductor arrangement preferably extends in an arc shape.

In a more advanced or different embodiment, the conductor path arrangement covers 40% to 100% or 50% to 100% of the area of the resistor arrangement. It is also possible that the conductor path arrangement covers 60% to 100% or 70% to 100% of the area of the resistor arrangement. The conductor path arrangement preferably covers 80% to 100% of the area of the resistor arrangement. As a particular preference, 90% to 100% of the area of the resistor arrangement are covered by the conductor path arrangement. As an alternative, it is also possible for 95% of the area of the resistor arrangement to be covered by the conductor path arrangement. All the above embodiments can also be configured in such a way that a maximum of 90%, 95% or 98% of the area of the resistor arrangement are covered by the conductor path arrangement. A very compact construction as compared with the prior art is thereby created.

According to one aspect of the invention, the problem mentioned second, namely that of creating a method for producing a signal transmitter which can be used at particularly low cost, is solved by the fact that the conductor path arrangement is applied to the resistor arrangement.

As a result, the method according to one aspect of the invention differs from the known method through a change in the sequence of production of the resistor arrangement and the conductor path arrangement. Since the resistor arrangement is produced first, it can be produced with a particularly uniform thickness and thus constant resistance values. Moreover, the resistor arrangement can be arranged particularly close to the slideway because it is protected from rubbing contact by the conductor path arrangement. The consumption of the very expensive materials for the resistor arrangement and for the conductor path arrangement is thereby kept particularly low.

According to another advantageous development of the invention, it contributes to a further reduction in the manufacturing costs for the signal transmitter if the resistor arrangement is applied as a layer to a carrier board.

According to another advantageous development of the invention, the production of the signal transmitter is particularly compact if the conductor path arrangement is applied as individual conductor path sections on the resistor arrangement, with the result that the conductor path sections are connected in an electrically conducting manner to the resistor arrangement.

According to another advantageous development of the invention, it contributes to a further reduction in the production costs for the signal transmitter if the resistor arrangement is printed onto the carrier board.

According to another advantageous development of the invention, it contributes to a further reduction in the production costs for the signal transmitter if the conductor path sections are printed directly onto the resistor arrangement.

According to another advantageous development of the invention, the signal transmitter is particularly compact if the resistor arrangement is applied over an area of the carrier board, over a slideway traversed by a sliding contact, and the conductor path arrangement is applied to the resistor arrangement as individual conductor path sections arranged transversely to the region of movement of the sliding contact.

According to another advantageous development of the invention, setting the resistance values of the resistor arrangement is particularly simple if the resistor arrangement is trimmed to envisaged resistance values with a laser beam by removal of material after the application of the conductor path arrangement.

It is particularly advantageous if the resistor arrangement is trimmed to envisaged resistance values by directing the laser beam at the resistor arrangement while moving it between two adjacent conductor path sections. It is thereby possible to perform the removal of material from the resistor arrangement leading to the material recess in the resistor arrangement.

BRIEF DESCRIPTION OF THE DRAWINGS

The invention permits numerous embodiments. To further illustrate its basic principle, one of these embodiments is illustrated in the drawing and will be described in the following text. In the drawing.

DETAILED DESCRIPTION OF THE PRESENTLY PREFERRED EMBODIMENTS

Figure 1:
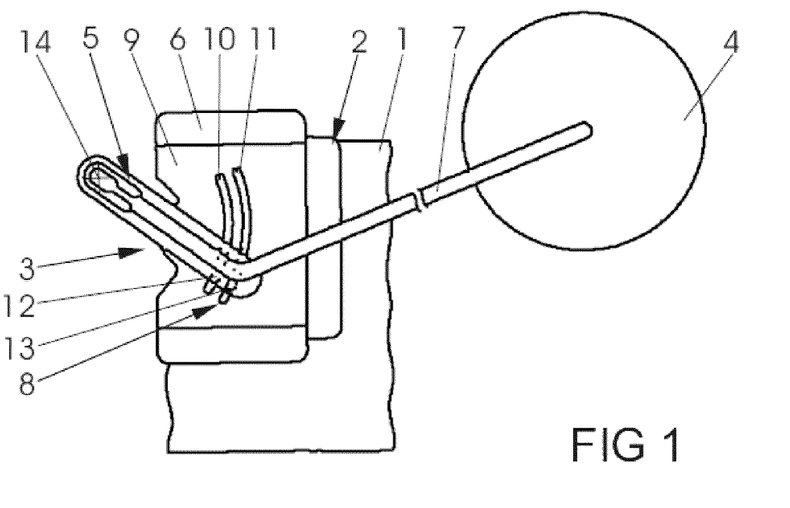
FIG. 1 is a fill level sensor having a signal transmitter.

FIG. 1 shows a fill level sensor 2 mounted in a vertical wall 1 within a fuel container. The fill level sensor 2 has a float 4 secured on a lever arm 3. The float 4 follows a fuel fill level (not illustrated) in the fuel container and, in the process, pivots the lever arm 3. The lever arm 3 is pivotably mounted on a support 6 by a bracket 5 manufactured from plastic and has a lever wire 7, secured on the bracket 5, for holding the float 4. The pivoting angle of the lever arm 3 is detected by a signal transmitter 8 designed as a potentiometer and is converted into electric signals. The signal transmitter 8 has two slideways 10, 11, which are arranged on a carrier board 9, and two sliding contacts 12, 13, which are secured on the bracket 5 and are connected electrically to one another, for bridging the slideways 9, 9'. The carrier board 9 is secured on the support 6. As a result, the electric signals corresponding to the fuel fill level occur at the support 6 and thus at a fixed component of the fill level sensor 2. The lever arm 3 has a schematically illustrated bearing location 14 in the support 6 with a bearing axis extending perpendicularly to the plane of the drawing.

Figure 2:
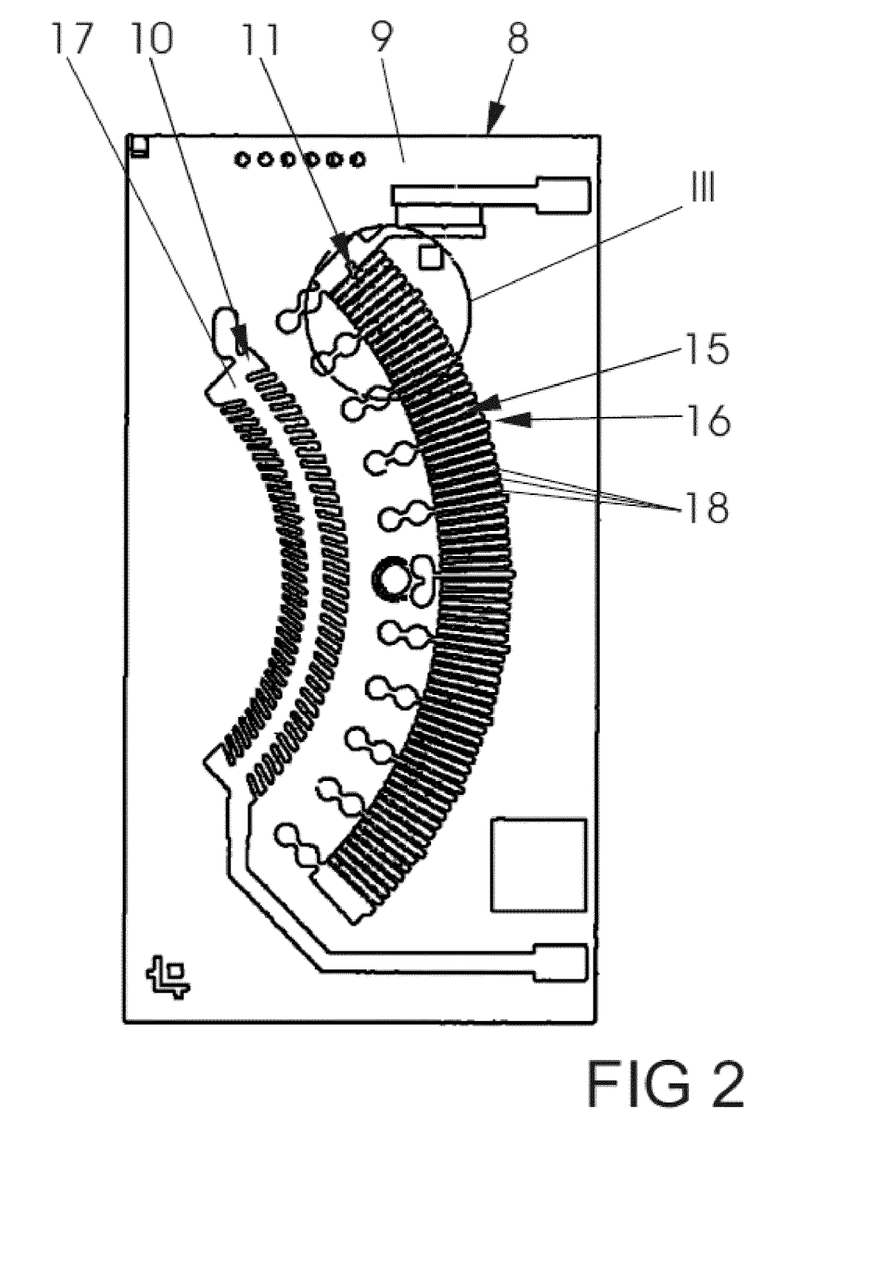
FIG. 2 is a partial region of the signal transmitter from FIG. 1 on a greatly enlarged scale.

FIG. 2 shows the carrier board 9 of the signal transmitter 8 with the slideways 10, 11 formed thereon, on an enlarged scale. One of the slideways 11 has a conductor path arrangement 16 applied to a resistor arrangement 15, while the other slideway 10 is designed as an arc-shaped electric conductor 17. The conductor path arrangement 16 has a plurality of conductor path sections 18 applied to the resistor arrangement 15. The conductor path sections 18 are arranged transversely to the direction of movement of the sliding contact 13 illustrated in FIG. 1 and are connected in an electrically conducting manner to the resistor arrangement 15.

Figure 3:
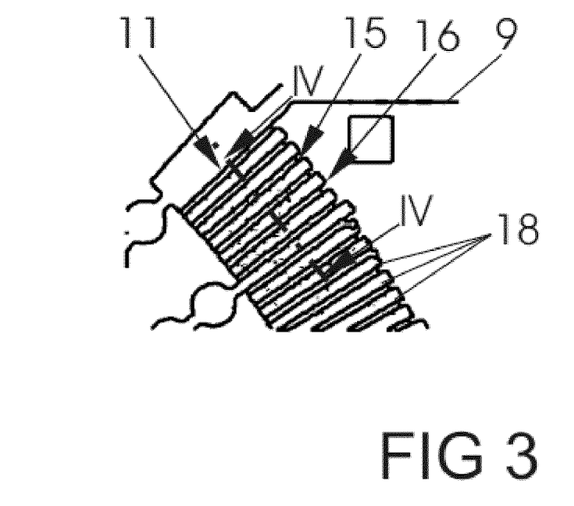
FIG. 3 is an enlarged illustration of the detail III of the signal transmitter from FIG. 2.

FIG. 3 shows a detail III of the carrier board 9 from FIG. 2 in an enlarged illustration. Here, it can be seen that the conductor path sections 18 are spaced apart slightly from one another. Visible between the conductor path sections 18 and accessible for a laser beam is the resistor arrangement 15.

Figure 4:
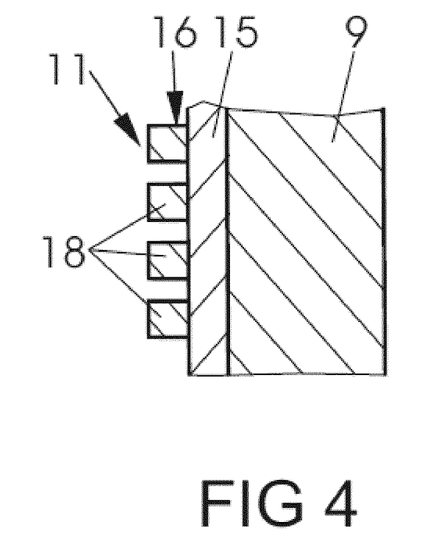
FIG. 4 is a section through the signal transmitter from FIG. 3 along the line IV-IV.

FIG. 4 shows a section through the carrier board 9 from FIG. 3 along the line IV-IV. Here, it can be seen that the resistor arrangement 15 is arranged as a layer on the carrier board 9. The conductor path sections 18 of the conductor path arrangement 16 are printed onto the layer of the resistor arrangement 15.

For production, the layer of the resistor arrangement 15 is first printed onto the carrier board 9. The conductor path arrangement 16 is then printed onto the resistor arrangement 15. In this operation, the arc-shaped electric conductor 17 can simultaneously be printed onto the carrier board 9. To trim the electric resistance of the resistor arrangement 15, the layer of the resistor arrangement 15 is partially removed by removal of material between the conductor path sections 18 by a laser beam.

Figure 5:
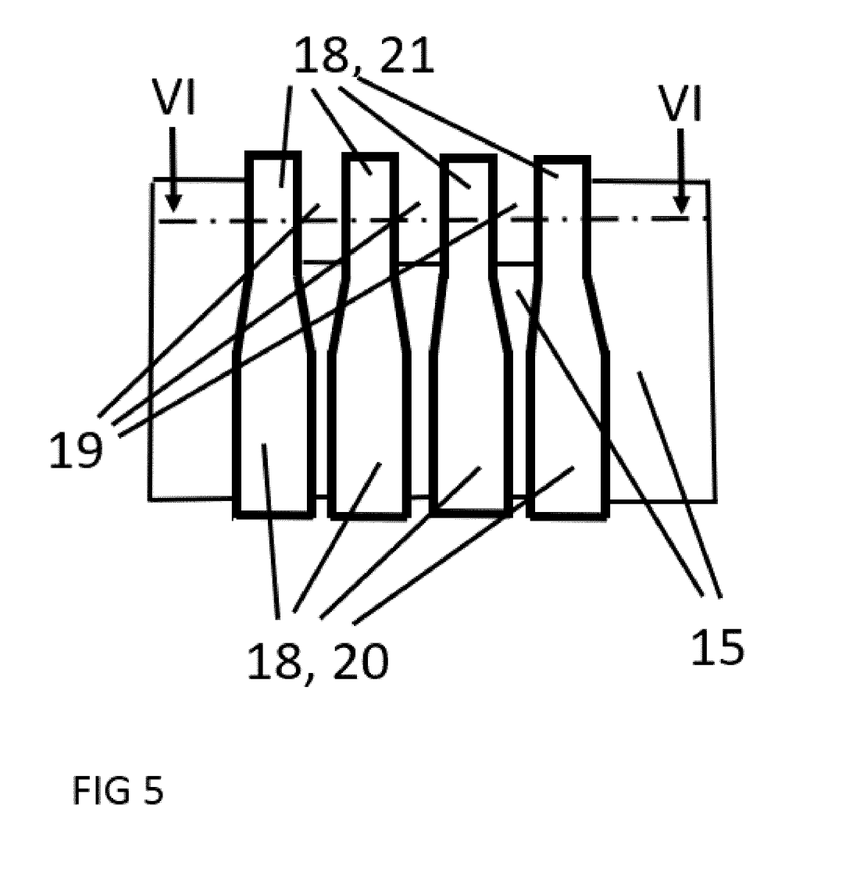
FIG. 5 is a detail III of the signal transmitter from FIG. 2.

FIG. 5 shows an alternative embodiment of the detail III of the carrier board 9 from FIG. 2 in an enlarged illustration. Here, it can be seen that the conductor path sections 18 are spaced apart slightly from one another. The resistor arrangement 15 is visible between the resistor path sections 18. Moreover, it can be seen that the conductor path sections 18 each have two subsections 20, 21 that have different material thicknesses from one another. The material thickness is measured in the plane of extent of the conductor path sections 18 and transversely to the direction of extent thereof. The material recesses 19 in the resistor arrangement 15 are each arranged between two sections of the resistor arrangement 22 that are covered by two subsections of two adjacent conductor path sections 18, 21. These two subsections 21 are preferably in each case the subsection 21 with the lower material thickness.

Figure 6:
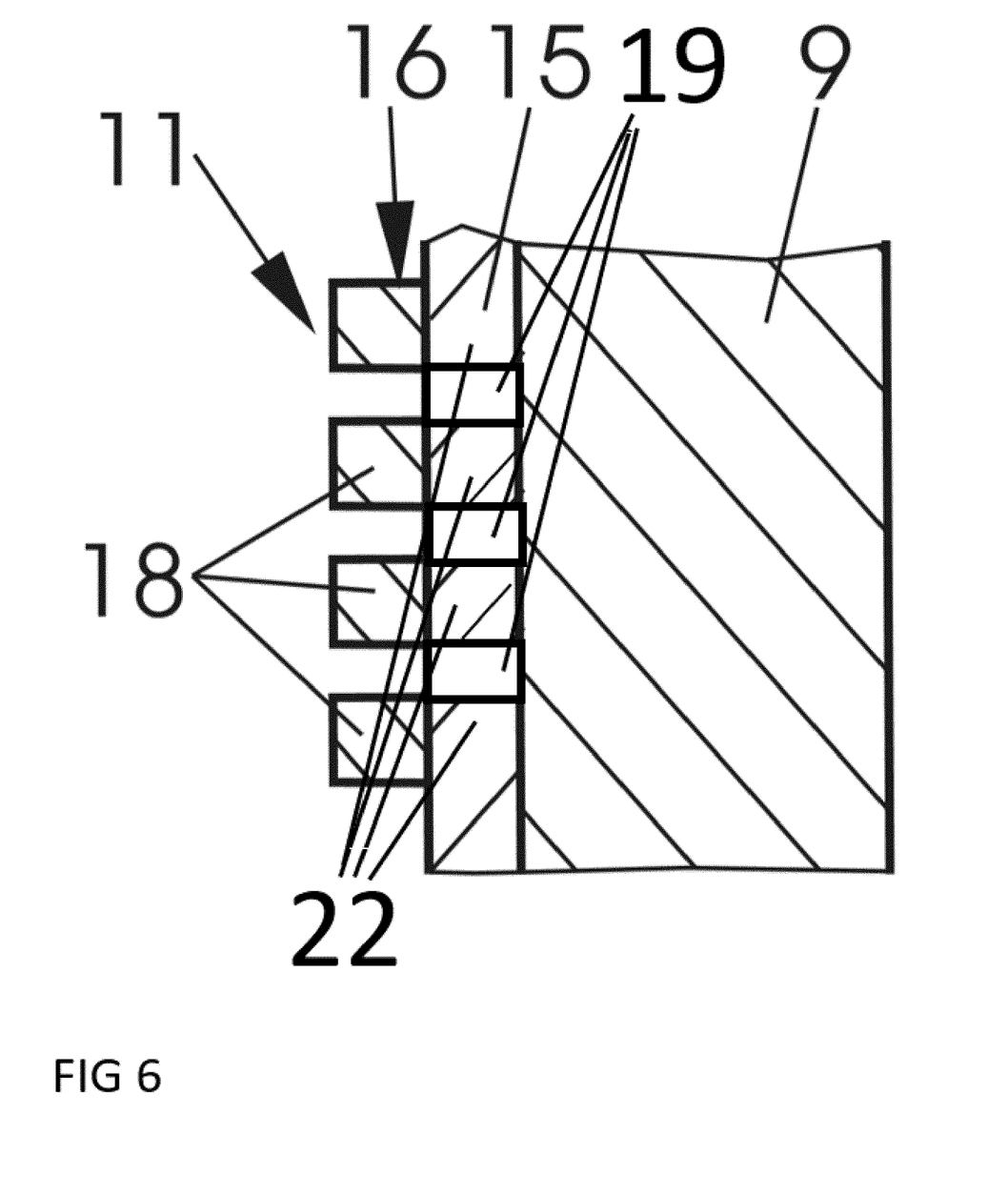
FIG. 6 is a section through the signal transmitter from FIG. 5 along the line VI-VI.

FIG. 6 shows a section through the carrier board 9 from FIG. 5 along the line VI-VI. Here, it can be seen that the resistor arrangement 15 is arranged as a layer on the carrier board 9. The conductor path sections 18 of the conductor path arrangement 16 are printed onto the layer of the resistor arrangement 15. It can furthermore be seen from FIG. 6 that the material recesses 19 of the resistor arrangement 15 are each arranged between two sections of the resistor arrangement 22 that are covered by two adjacent conductor path sections 18.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A signal transmitter for a fill level sensor of a container of a motor vehicle configured to produce electric signals as a function of a fill level, comprising:
   a resistor arrangement,
   a conductor path arrangement having a slideway and arranged on the resistor arrangement and connected to the resistor arrangement, and
   a sliding contact configured to move in accordance with the fill level and slides across the slideway of the conductor path arrangement,
   wherein the resistor arrangement and the conductor path arrangement at least partially overlap,
   wherein the resistor arrangement defines at least one material recess arranged between two sections of the resistor arrangement that are covered by two mutually adjacent conductor path sections.

2. The signal transmitter as claimed in claim 1,
   wherein the resistor arrangement is a layer arranged on a carrier board.

3. The signal transmitter as claimed in claim 1,
   wherein the conductor path arrangement has individual conductor path sections arranged on the resistor arrangement and connected electrically thereto.

4. The signal transmitter as claimed in claim 1,
   wherein the resistor arrangement is arranged below the slideway.

5. The signal transmitter as claimed in claim 3,
   wherein the individual conductor path sections extend transversely to a direction of extent of the slideway so that each segment has a first end arranged at a radially inner edge of the conductor path that is arc shaped and a second end opposite the first end that is arranged at a radially outer edge of the conductor path that is arc shaped,
   wherein the individual conductor path sections are arranged spaced apart from one another transversely to a direction of extent thereof.

6. The signal transmitter as claimed in claim 1,
   wherein no material recess in the resistor arrangement is arranged below the slideway.

7. A method for producing a signal transmitter for a fill level sensor of a container, comprising:
   applying a conductor path arrangement to a resistor arrangement;
   wherein the conductor path arrangement is connected to the resistor arrangement, and
   wherein the resistor arrangement and the conductor path arrangement at least partially overlap; and
   trimming the resistor arrangement to specified resistance values with a laser beam by removal of material after the application of the conductor path arrangement,
   wherein the resistor arrangement is trimmed to the specified resistance values by directing the laser beam at the resistor arrangement while moving it between two adjacent conductor path sections to perform the removal of material.

8. The method as claimed in claim 7, further comprising:
   applying the resistor arrangement as a layer to a carrier board.

9. The method as claimed in claim 7,
   wherein the conductor path arrangement is applied as individual conductor path sections on the resistor arrangement, wherein each of the individual conductor path sections has a first end arranged at a radially inner edge of the conductor path that is arc shaped and a second end opposite the first end that is arranged at a radially outer edge of the conductor path that is arc shaped,
   wherein the individual conductor path sections are connected in an electrically conducting manner to the resistor arrangement.

10. The method as claimed in claim 7,
    wherein the resistor arrangement is printed onto a carrier board.

11. The method as claimed in claim 7,
    wherein individual conductor path sections are printed directly onto the resistor arrangement.

12. The method as claimed in claim 7, wherein the resistor arrangement is applied:
    over an area of a carrier board,
    over a slideway configured to traversed by a sliding contact, and
    the conductor path arrangement is applied to the resistor arrangement as individual conductor path sections arranged transversely to a region of movement of the sliding contact.

* * * * *